United States Patent [19]

Schwefel

[11] Patent Number: 4,517,657
[45] Date of Patent: May 14, 1985

[54] INTEGRATED BIT PROCESSOR/WORD PROCESSOR CONTROL SYSTEM

[75] Inventor: Ernst Schwefel, Traunreut, Fed. Rep. of Germany

[73] Assignee: Dr. Johannes Heidenhain GmbH, Traunreut, Fed. Rep. of Germany

[21] Appl. No.: 397,839

[22] Filed: Jul. 13, 1982

[30] Foreign Application Priority Data

Aug. 4, 1981 [DE] Fed. Rep. of Germany ....... 3130746

[51] Int. Cl.³ .............................................. G06F 7/00
[52] U.S. Cl. .................................................... 364/900
[58] Field of Search ............................... 364/200, 900

[56] References Cited

U.S. PATENT DOCUMENTS

| 4,078,259 | 3/1978 | Soulsby et al. | 364/900 |
| 4,175,284 | 11/1979 | Shuraym | 364/200 |
| 4,180,862 | 12/1979 | Seipp | 364/900 |
| 4,200,916 | 4/1980 | Seipp | 364/900 |

Primary Examiner—Gareth D. Shaw
Assistant Examiner—Tim A. Wiens

Attorney, Agent, or Firm—Willian Brinks Olds Hofer Gilson & Lione Ltd.

[57] ABSTRACT

A freely programmable control system is disclosed which includes a computer, a data memory, and a program memory, as well as a program controllable logical network for individual bit processing and an individual bit memory. The disclosed control system operates as an integrated system which utilizes both commands for the computer and separate commands for individual bit processing. Both types of commands are stored in the program memory as an integrated program. During individual bit processing the commands for the individual bit operations are routed from the program memory to the logical network circuit for individual bit processing, and are there executed. Similarly, during computer processing the commands for the computer are transferred directly to the computer and are there executed. The commands for the individual bit processing are kept away from the computer by a switching circuit which operates to supply the computer with a command to increment the computer program counter for each individual bit instruction.

9 Claims, 1 Drawing Figure

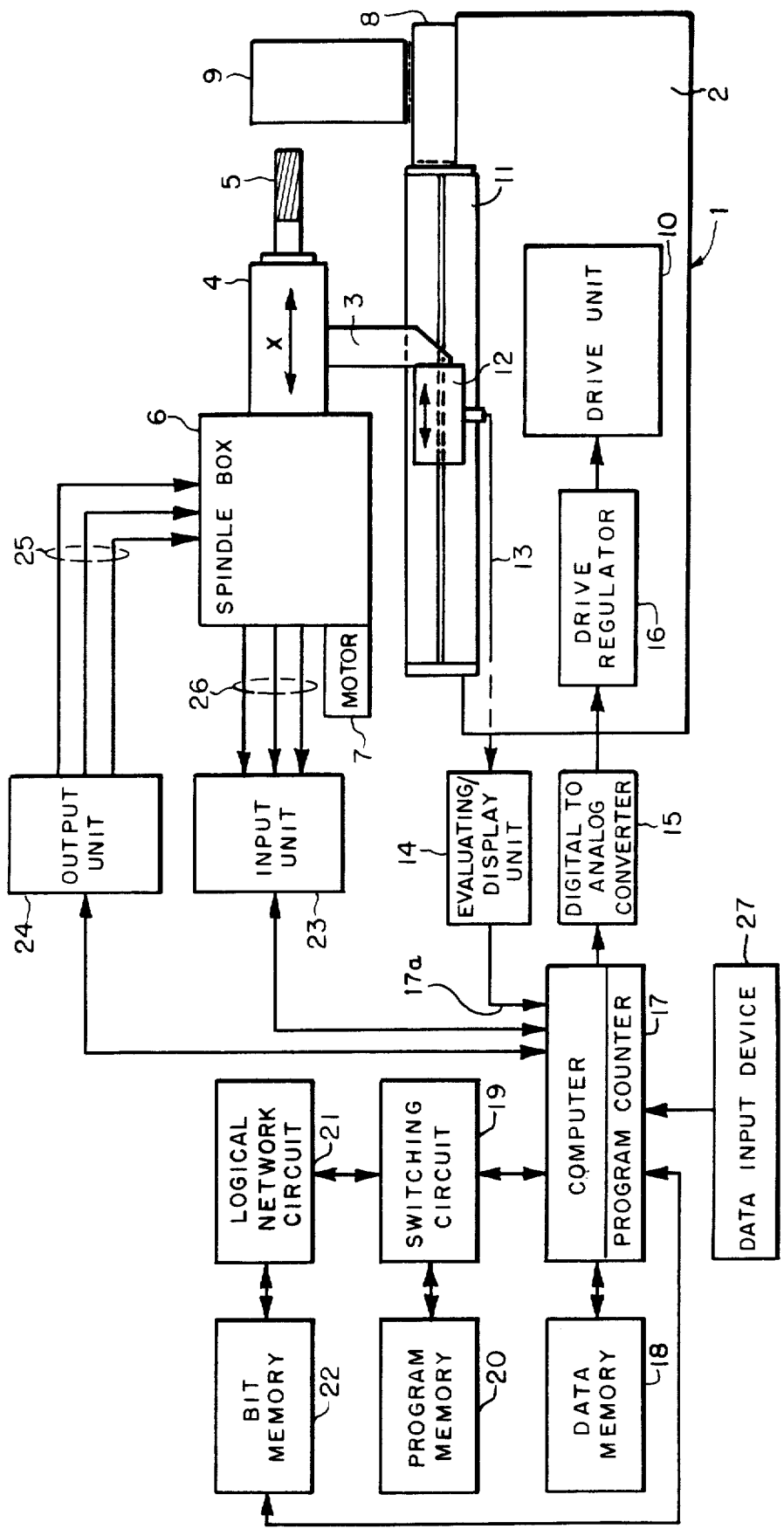

INTEGRATED BIT PROCESSOR/WORD PROCESSOR CONTROL SYSTEM

BACKGROUND OF THE INVENTION

This invention relates to an improved, programmable, process control system of the type which includes a computer, a data memory coupled to the computer, and a program memory which stores a plurality of computer commands.

In the past, relay controls have been used to control processing machines. Recently, two types of programmable control systems for such processing machines have come into use. The first of these types includes freely programmable control systems utilizing digital computers which act to process digital words, each of which is made up of a plurality of bits. The second type includes freely programmable control systems that have no digital computer and which operate as bit processors on individual bits. These types of programmable control systems preferably operate on individual bit data which are fed in, stored, and read out. These individual bit data are used as inputs to logical operations, the result of which determine the manner in which the processing machine is controlled.

The processing speed of control systems which utilize bit processors is often in the range of one microsecond per logical operation. Digital computers of the type used in freely programmable control systems serve mainly for the processing of numerical data and the execution of arithmetic operations. When such digital computers are used to perform logical operations on individual bit data, however, the processing rate is often in the range of 10-20 micro-seconds per logical operation. Because of this slow processing rate, digital computers are on occasion unsuitable for some control systems which require high speed operation.

The slow processing rate of digital computers, when used in a bit processing mode, results from the absence of commands for individual bit processing. For this reason, a digital computer must often execute a series of commands in order to execute a particular desired individual bit operation.

SUMMARY OF THE INVENTION

The present invention is directed to an integrated bit processor/word processor control system which combines the advantages of a freely programmable control system for individual bit operations and a numerical position control.

According to this invention, a programmable process control system of the type which includes a computer, a data memory coupled to the computer, and a program memory which stores a plurality of computer commands is provided with a program controllable logical network which comprises means for providing individual bit processing. In addition, a bit memory is coupled to the logical network and a plurality of commands for the bit processing means are stored in the program memory. Furthermore, means are provided for interconnecting the program memory, the computer, and the logical network to form an integrated process control system. This interconnecting means includes means for directing the commands for the bit processing means to the logical network for execution by the bit processing means, as well as means for directing the computer commands to the computer for execution by the computer. This integrated system allows a single program to be written having some portions adapted for execution by the computer and other portions adapted for execution by the bit processing means. The interconnecting means insures that the system operates as an integrated whole and that commands are routed appropriately either to the bit processing means or to the computer.

This invention provides the important advantage in that it provides a control system for processing machines in which both arithmetic and logical bit operations are performed at high processing speeds. Arithmetic and logical bit operations can be combined in a common program to yield a highly efficient program control system with reduced costs. Additional advantageous aspects of this invention are set forth in the dependent claims.

The invention itself, together with further objects and attendant advantages, will best be understood by reference to the following detailed description taken in conjunction with the accompanying drawing.

BRIEF DESCRIPTION OF THE DRAWING

The drawing is a block diagram of a process control system which incorporates a presently preferred embodiment of this invention.

DETAILED DESCRIPTION OF THE PRESENTLY PREFERRED EMBODIMENT

Turning now to the drawings, the figure schematically represents a three axis milling machine 1 in which, for simplification, only one direction of movement X is shown. This milling machine 1 includes a bed 2 which serves to mount a slide piece 3 which is slidable in the X direction. The slide piece 3 carries a headstock 4 which serves to mount a tool 5. A spindle box 6 is secured to the headstock 4. The tool 5 is driven by means of a spindle motor 7 which acts by means of shifting gears (not shown) included in the spindle box 6. A table 8 is guided on the bed 2 and serves to mount a work piece 9 to be processed. For the positioning of the tool 5 in the X direction, the slide piece 3 is shiftable along this direction by means of a drive unit 10.

In order to determine the actual measured value of the position of the cutting edge of the tool 5 as the slide piece 3 moves, there is attached to the bed 2 of the milling machine 1 a position measuring device 11. This measuring device 11 includes a scale which is scanned by a scanning unit 12 which is rigidly attached to the slide piece 3. The actual measured values of position are applied via a conductor 13 to an evaluating/display unit 14 and then to an input 17a of a computer 17. The computer 17 utilizes this information to compare the actual value of the position of the slide piece 3 with the desired value. Based on this comparison, the computer 17 generates an output signal which is applied to a digital to analog converter 15. The output of the converter 15 acts on a drive regulator 16 which, in turn, acts on the drive unit 10.

The programmed desired values for the position of the tool 5 are taken from a data memory 18. The computer 17 operates to achieve the desired positioning of the tool 5 in the X direction by causing the generation of an analog output signal by the digital to analog converter 15, which analog output signal is characterized by a voltage which is proportional to the difference between the programmed desired position value and the actual measured position value of the tool 5.

According to this invention, the digital computer 17 is also connected by means of a switching circuit 19 to a program memory 20 and to a program controllable logical network circuit 21. This network circuit 21 includes means for performing individual bit processing, and is connected with an individual bit memory 22 for the storage of individual bit data used in connection with logical operations performed by the logical network circuit 21.

In accordance with this invention, the program memory 20 of the digital computer 17 stores two types of commands. The first of these types is commands for the digital computer. Typically, these commands are used in conjunction with the performance of arithmetic functions or operations. The second type of command stored in the program memory 20 is commands for individual bit operations performed by the programmable logical network circuit 21. These two types of commands are integrated in the program memory 20 as a single program to be utilized in a single processing operation which includes both individual bit processing and computer processing. During individual bit processing, commands for the individual bit operations are transferred by the switching circuit 19 from the program memory 20 to the logical network circuit 21. These commands are then executed by the individual bit processing means included in the logical network circuit 21. The command reading time of the digital computer 17 is preserved for commands for the individual bit processing. The commands for the individual bit processing are not transmitted to the digital computer 17 by the switching circuit 19; instead, the switching circuit 19 supplies as an input to the digital computer 17 in each case a command which causes the computer program counter to be incremented by one instruction. The individual bit memory 22 is connected during individual bit processing to the logical network circuit 21, and is connected during computer processing to the digital computer 17.

The switching over from computer processing to individual bit processing is controlled by the computer 17 in response to a command for the digital computer 17; similarly, the switching back to computer processing from individual bit processing is performed under the control of the logical network circuit 21 by reason of a command for the logical network circuit 21. In an alternate embodiment, this switchover between individual bit processing and computer processing can also take place in dependence on selected command addresses of the program memory 20. For example, the switching circuit 19 can be arranged to route all commands at addresses between two selected values to the logical network circuit 21 instead of to the computer 17.

An input unit 23 and an output unit 24 for the individual bit processing are connected preferably by means of the digital computer 17 to the logical network circuit 21. The output unit 24 acts by means of the three output lines 25 on setting members (not shown) in the spindle box 6 for the selection of various translations of the switching gear. The particular translational relations are determined by sensors (not shown) in the spindle box 6 and are supplied by means of three input lines 26 to the input unit 23. The logical network circuit 21 carries out individual bit operations corresponding to the program contained in the program memory 20 in response to signals provided to the logical network circuit 21 by means of the input unit 23. The results of the individual bit processing by the logical network circuit 21 are used to cause the output unit 23 to apply appropriate signals on lines 25 to control the shifting gear. Both the input unit 23 and the output unit 24 act on selected storage locations included in the individual bit memory 22. The operation of the input unit 23 and of the output unit 24 takes place cyclically by the computer 17. In each case, before commencement of command execution by the logical network 21, data bits are transferred by the computer 17 from the input unit 23 into the bit memory 22. The results of individual bit processing are stored in the bit memory 22, and at the end of bit processing these results are transferred by the computer 17 from the bit memory 22 to the output unit 24. A respective bit storage device in the bit memory 22 is allocated to each input line 26 of the input unit 23 and to each output line 25 of the output unit 24. Thus, the bit memory 22 stores data bits indicative of the logical state of both the input unit 23 and the output unit 24, as well as intermediate results of bit processing which are required for further logical operation. In addition, data transferred by the computer 17 to the logical network 21 (such as the rotational speed of the spindle) as well as data transferred from the logical network 21 to the computer 17 are stored in the bit memory 22.

As an example of a bit processing command executed by the logical network 21, the logical network 21 can be used to switch on a cooling system (not shown) included in the milling machine 1 when two conditions are simultaneously met: the switch for the cooling system is turned on (Input data bit E1); and the spindle is rotating (Input data bit E2). These two input data bits E1 and E2 are applied as inputs (not shown) to the input unit 23. In order to execute this command, the logical network 21 responds to the AND command stored in the program memory 20 by generating an output bit A1 which is equal to E1 AND E2 and is applied via the output unit 24 to control a coolant pump (not shown). The logical network 21 also includes means for executing the following individual bit processing logical operations, in addition to the AND function illustrated above: NAND, OR, NOR, XOR, XNOR, RESET, and SET.

In an alternate embodiment (not shown) the input unit 23 and the output unit 24 can be connected directly to the logical network circuit 21. A data input device 27 is provided for loading numerical data into the data memory 18, for loading program commands into the program memory 20, and for loading individual bit data into the individual bit memory 22. This data input device 27 interfaces which each of the memories 18, 20, 22 by means of the digital computer 17.

Of course, it should be understood that a wide range of changes and modifications to the preferred embodiment described above will be apparent to those skilled in the art. For example, in addition to the control of the switching gear described above, this invention can be used to control other machine functions, such as the direction of spindle rotation, the actuation of coolant flow, and the like by correspondingly programmed logical operations.

It is therefore intended that the foregoing detailed description be regarded as illustrative rather than as limiting, and that it be understood that it is the following claims, including all equivalents, which are intended to define the scope of this invention.

I claim:

1. In a programmable process control system of the type comprising a multiple bit computer which comprises a program counter, a data memory coupled to the computer, and a program memory which stores a plurality of computer commands, the improvement comprising:

- a program controllable logical network comprising means for providing individual bit processing of individual bit information;
- a bit memory coupled to the logical network for storing said individual bit information;
- a plurality of commands for the bit processing means stored in the program memory, said computer commands and said commands for the bit processing means stored in the program memory as an integrated program for the process control system; and
- means for interconnecting the program memory, the computer, and the logical network to form an integrated process control system, said interconnecting means comprising:
  - first means, responsive to the program counter, for directing the plurality of commands for the bit processing means from the program memory to the logical network for execution by the bit processing means;
  - second means, responsive to the program counter, for directing the plurality of computer commands from the program memory to the computer for execution by the computer;
  - switching means for isolating the computer from the plurality of commands for the bit processing means; and
  - means for supplying to the computer a computer command for incrementing the program counter in response to each of the plurality of commands for the bit processing means from which the computer is isolated, such that the command reading time of the computer is preserved during the execution of commands by the individual bit processing means.

2. The invention of claim 1 wherein the interconnecting means further comprises:

- means for activating the first means to direct commands to the bit processing means in response to a predetermined computer command; and
- means for activating the second means to direct commands to the computer in response to a predetermined command for the bit processing means.

3. The invention of claim 1 wherein the first and second means are activated by respective selected addresses of the program memory.

4. The invention of claim 1 further comprising:

- an input unit coupled to the bit memory to modify a first set of preselected bit storage devices included in the bit memory to correspond to measured variables;
- an output unit coupled to the bit memory to interface with a second set of preselected bit storage devices included in the bit memory; and
- means for synchronizing the transfer of information between the bit memory and the input unit and the output unit with the computer.

5. The invention of claim 1 further comprising:

- means for interconnecting the bit memory and the logical network when the first means is activated; and
- means for interconnecting the bit memory and the computer when the second means is activated.

6. The invention of claim 1 wherein the switching means comprises means for connecting the computer with both the logical network and the program memory.

7. The invention of claim 1 wherein the logical network is separate from the computer, and wherein the logical network comprises means for executing a set of individual bit logical operations on pairs of bit information stored in the bit memory.

8. The invention of claim 7 wherein the set of individual logical bit operations comprises the AND operation.

9. The invention of claim 7 wherein the set of individual logical bit operations comprises the AND, NAND, OR, NOR, XOR, and XNOR operations.

* * * * *